(12) United States Patent
Brady et al.

(10) Patent No.: US 10,751,882 B1
(45) Date of Patent: Aug. 25, 2020

(54) END EFFECTOR FOR AUTONOMOUS OBJECT RETRIEVAL

(71) Applicant: Amazon Technologies, Inc., Seattle, WA (US)

(72) Inventors: Tye Michael Brady, Southborough, MA (US); Anna Buchele, Boston, MA (US); Juan Carlos del Rio, Mexico City (MX); Rocco DiVerdi, Holden, MA (US); Yuzhong Huang, Ningbo (CN); Hunter Normandeau, Portsmouth, NH (US); Timothy Stallman, Groton, MA (US); Ziyu Wang, Henan (CN)

(73) Assignee: Amazon Technologies, Inc., Seattle, WA (US)

( * ) Notice: Subject to any disclaimer, the term of this patent is extended or adjusted under 35 U.S.C. 154(b) by 267 days.

(21) Appl. No.: 15/978,995

(22) Filed: May 14, 2018

(51) Int. Cl.
| | |
|---|---|
| B25J 9/16 | (2006.01) |
| B25J 9/10 | (2006.01) |
| B25J 13/08 | (2006.01) |
| B25J 15/06 | (2006.01) |
| B25J 19/02 | (2006.01) |

(52) U.S. Cl.
CPC ............. B25J 9/1697 (2013.01); B25J 9/10 (2013.01); B25J 9/1653 (2013.01); B25J 9/1664 (2013.01); B25J 13/08 (2013.01); B25J 15/0616 (2013.01); B25J 19/021 (2013.01)

(58) Field of Classification Search
CPC . B25J 9/1697; B25J 19/021; B25J 9/10; B25J 13/08; B25J 9/1664; B25J 9/1653; B25J 15/0616

USPC ........................................................ 700/245
See application file for complete search history.

(56) References Cited

U.S. PATENT DOCUMENTS

| | | | | |
|---|---|---|---|---|
| 5,446,835 | A * | 8/1995 | Iida | B25J 9/1687 700/259 |
| 6,193,291 | B1 * | 2/2001 | Morroney | B25B 11/005 294/189 |
| 8,606,398 | B2 * | 12/2013 | Eakins | B25J 9/1687 700/117 |
| 9,486,921 | B1 * | 11/2016 | Straszheim | B25J 9/1687 |
| 10,012,664 | B2 * | 7/2018 | Wasson | B01L 3/0279 |
| 2003/0035711 | A1 * | 2/2003 | Gilchrist | H01L 21/68707 414/744.5 |
| 2008/0009972 | A1 * | 1/2008 | Nihei | B25J 9/1669 700/245 |
| 2012/0259462 | A1 * | 10/2012 | Aoba | B25J 9/1697 700/245 |

(Continued)

OTHER PUBLICATIONS

Olson, Edwin. AprilTag: A robust and flexible visual fiducial system. Proceedings of the IEEE International Conference on Robotics and Automation (ICRA), May 2011.

Primary Examiner — Jaime Figueroa
(74) Attorney, Agent, or Firm — Knobbe, Martens, Olson & Bear, LLP

(57) ABSTRACT

Features are disclosed for an end effector for automated identification and handling of an object. The end effector includes an end effector that can be positioned over a pick point of an overpackage in which a desired object is location using sensors. Using the location information, the end effector can identify a path to the pick point and detect whether the pick point is engaged by detecting environmental changes at the end effector.

20 Claims, 9 Drawing Sheets

(56) References Cited

U.S. PATENT DOCUMENTS

| | | | |
|---|---|---|---|
| 2013/0130369 A1* | 5/2013 | Wilson | G16B 99/00 435/289.1 |
| 2013/0211593 A1* | 8/2013 | Domae | B25J 9/1612 700/258 |
| 2014/0037413 A1* | 2/2014 | Takashima | B25J 15/0675 414/680 |
| 2014/0073043 A1* | 3/2014 | Holmes | G01N 35/00 435/287.3 |
| 2014/0234949 A1* | 8/2014 | Wasson | B01L 3/0275 435/287.2 |
| 2017/0062263 A1* | 3/2017 | Kesil | H01L 21/6838 |
| 2018/0117767 A1* | 5/2018 | Yokota | B25J 15/0052 |

* cited by examiner

END EFFECTOR FOR AUTONOMOUS OBJECT RETRIEVAL

CROSS-REFERENCE TO RELATED APPLICATION(S)

This application is related to U.S. patent application Ser. No. 15/978,762 filed on May 14, 2018, entitled "SELF-IDENTIFYING OVERPACKAGE FOR ROBOTIC RETRIEVAL" which is hereby expressly incorporated by reference in its entirety.

BACKGROUND

Robotic solutions capable of identifying and manipulating high volumes of objects may be included to automate fulfillment processes, such as picking an object from a receptacle, stowing an object within a receptacle, decanting an object, and packing an object for transfer to a new location (e.g., shipping to a recipient).

One barrier to achieving such a robotic solution is the enormous variation in the various objects that may be processed by the system. It is tremendously difficult for robots and automated solutions to physically manipulate each object, due in part to different shapes of the objects, different packaging material for the objects, different weights of the objects, or other physical characteristics that create uncertainty in identifying and grasping an object. The accuracy represents part of this barrier. Another aspect is speed. To provide advantages over existing object processing, manipulation of an object would need to be performed as fast, if not faster, than the existing processes.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
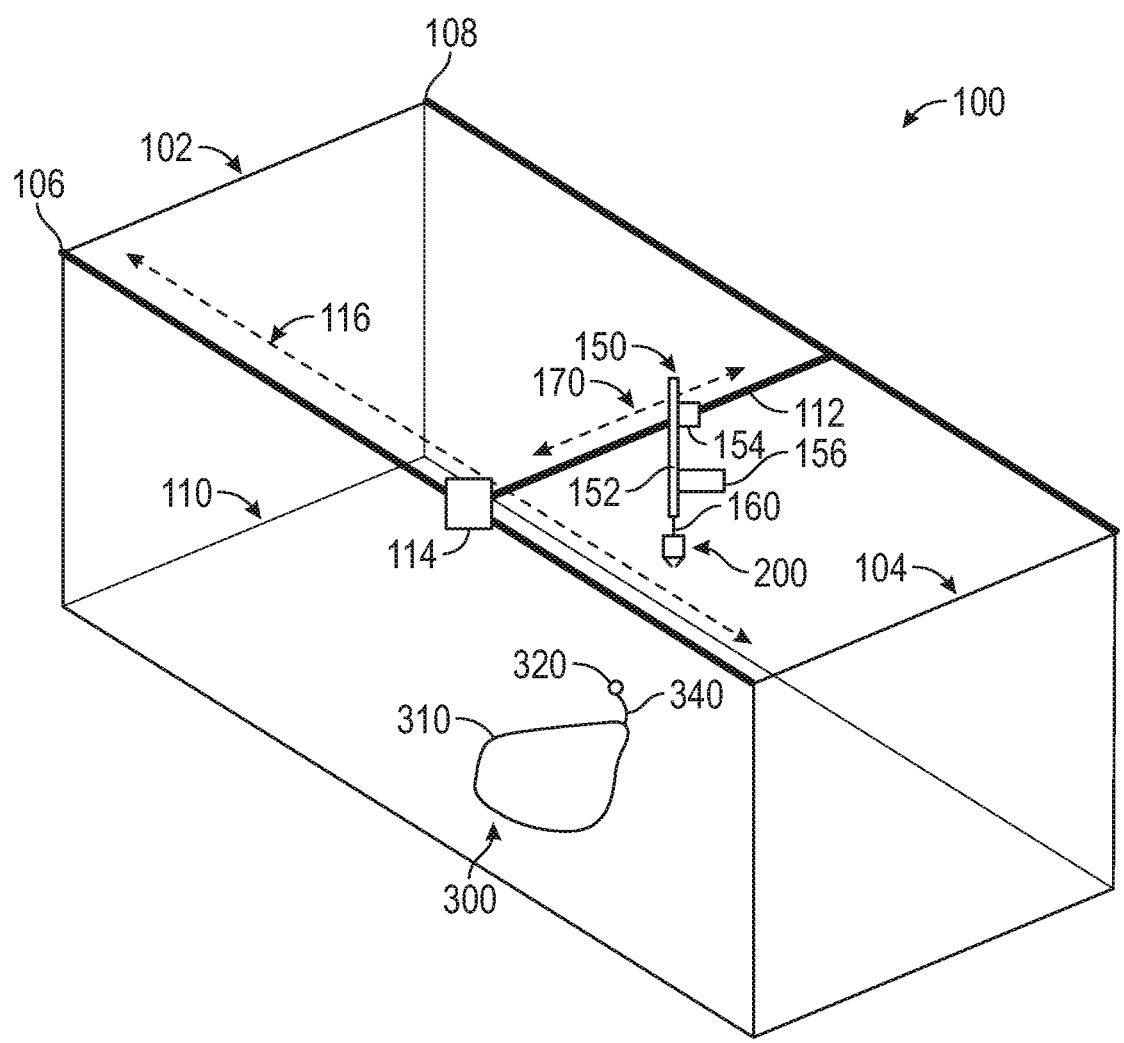
FIG. 1 is a block diagram showing an example robotic retrieval system capable of retrieving an overpackage from stowage using an end effector.

Within a fulfillment center, objects may be received for storage until such time as they are requested for delivery to a recipient or another fulfillment center. Objects of many different shapes and sizes may be processed through the fulfillment center. Objects may be processed by a robotic retrieval system. The robotic retrieval system may include autonomous actors such as robots or mobile drive units that may be deployed within the fulfillment center to facilitate the processing of objects. The ability of any given autonomous actor to manipulate an object may be limited to its ability to identify the object as well as a manner of grasping the object in a way that does not damage the object.

The present disclosure is generally related to an end effector that may locate and engage an overpackage that forms a handling unit for one or more objects in a fulfillment center. As described herein, the overpackage may include a self-identifying robotic handle, an envelope forming an inner recess to contain one or more objects, and one or more detectable identifiers on the overpackage. Using the detectable identifiers, an end effector of a robot or other autonomous actor may locate the overpackage in which an object of interest is stored. An end effector generally refers to a mechanism that can be positioned within a fulfillment center and activated to couple with the overpackage (and any object included therein) to move the overpackage to a destination location, such as a loading bay in the fulfillment center. As an example, the end effector may include a set of flanges supported by an outer body of the end effector. Each flange may pivot about the outer body and define a tip that, upon pivoting, secures a handle by pivoting toward a central point (e.g., the handle). The detectable identifiers may also provide guidance to position the end effector near the self-identifying robotic handle. Once near the handle, the end effector may engage the handle to create a coupling that allows the end effector to lift and move the overpackage to another location within the fulfillment system. The identifiers on the overpackage assist a robot or other automated actor in a fulfillment center to identify an object, orient the robot vis-a-vis the object (this may be referred to as "localizing to the object"), and grasp the object in a reliable and safe manner.

The overpackage may include features to increase discovery and manipulation of an object in addition to enveloping the object during processing. One such feature provides unique identification of a specific instance of an object enclosed in the overpackage. Using board games as an example, a specific instance of a board game would be a specific box containing a copy of the board game. An identifier for the board game may be associated with a unique identifier for an overpackage into which the board game will be placed. Once enclosed in or otherwise coupled with the overpackage, this specific instance of the board game may be uniquely identified using an identifier placed at a particular geometry on the overpackage. The identifier may indicate data associated with the overpackage such as its unique identifier. For example, an AprilTag may be included for basic data about the overpackage that can be easily detected using an image of the overpackage taken from a distance. A QUICK RESPONSE™ (QR) code may be included to encode more extensive data about the overpackage and to provide more detailed localization information indicating where on the overpackage the code is located. A passive radiofrequency identification (RFID) tag or other passive wireless circuit may be included for identification of the overpackage through wireless signaling when line of sight, such as for optical scanning of QR codes or AprilTags, to the overpackage is occluded. Example features of AprilTags are described by Edwin Olson in "AprilTag: A Robust and Flexible Visual Fiducial System" Proceedings of the IEEE International Conference on Robotics and Automation (ICRA) (May 2011) which is incorporated by reference in its entirety.

The features also provide information about how and where a robot or other autonomous actor should grasp the overpackage. The grasping information can be embedded into identifiers on the overpackage. For example, QR codes, when viewed through a camera or other imaging system, can produce a three-dimensional (3D) localization vector. The 3D localization vector may provide location information to orient the camera system to the overpackage. The camera system may include a sensor associated with an end effector of the autonomous actor that will retrieve the overpackage. Because the 3D localization vector orients the end effector to the overpackage, the end effector may be accurately and quickly moved to engage with a specific portion of the overpackage such as a handle or other pick point.

As mentioned, the grasping can also present issues for autonomous actors. To facilitate the attachment, the overpackage may preferably include structures that provide a consistent and reliable point for machine manipulation. Examples of structures for reliable machine attachment include a suction point on the overpackage, a protruding robotic pick point (e.g., a ball handle), or a location for hooking the overpackage (e.g., a grommet).

An overpackage may include redundant identifiers or attachment structures. Having redundant solutions allows for less defects per million objects (DPMO), more flexibility and real-time adjustments to different environments that the overpackage will encounter (e.g., unstructured storage, manipulation while moving, alternative storage options).

In one embodiment utilizing overpackages, a specific instance of an object may be placed inside an overpackage by a human or automated machine, assuring the right size overpackage has been selected based on physical characteristics of the object such as dimensions of the object or weight of the object. Once the object is enclosed within the overpackage, a record may be created associating the identifier for the object with the identifier for the overpackage. The attributes associated with the object (e.g., size, weight, object classifier, etc.) may be correlated (e.g., hand scanning of codes, optical scanning of codes, manual typing of code) with a unique overpackage identification number. The unique overpackage identification number may be encoded within visible QR codes associated with the overpackage. The overpackage structure and indicators thereon enables the overpackage to be both self-identifying and more easily graspable by autonomous systems.

Multiple different overpackages may be packed into a container (e.g., a tote, a bin, a pallet, a crate, etc.) and moved into a robotic retrieval system where robotic arms and gantry like systems could automatically pick, sort, and move the enclosed objects from the container. Identification of an object may be achieved by reading the identifiers on the overpackage. The overpackage unique identifier can be used to identify the object identifier.

In some implementations, the identifier on the overpackage, such as a QR code, may provide a known optical pattern with known spacing that provides the robotic system with a highly accurate 3D vector from the sensing optical camera to the specific overpackage QR code. This allows for the associated robotic end effector to determine exactly where the overpackage is in order to manipulate the overpackage and thus the object enclosed within.

In some implementations, the overpackage may be formed of a material that is "robot suction friendly" such that a suction end effector can reliably place a suction point and inherently pick it up by drawing a vacuum within the suction cup. It may be desirable for overpackage to be at least partially formed of a transparent material or include a transparent portion to allow inspection of the enclosed object.

Suction is one example of how an attachment may be made with the overpackage. Some embodiments of the robotic retrieval system may include features to pick up the overpackage such as using a robotic handle physically attached to the overpackage via a semi-rigid tether. The robotic retrieval system may detect an identifier on the overpackage to obtain relative directions to from the self-identifying identifier to the location of the robotic handle. Using the directions, the robotic retrieval system may maneuver an end effector near the robotic handle. The robotic handle may be implemented as a metallic multi-faced handle. The handle may also include scannable identifiers to facilitate further positioning of the robotic retrieval system (e.g., the end effector) and attachment with the overpackage. Once in the general vicinity of the robotic handle, the robotic retrieval system may read various embedded or surface printed identifiers on the robotic handle to both confirm identity of the overpackage as the overpackage enclosing the object to be retrieved and also localize a vector for the end effector to move to.

Once near the robotic handle, the end effector of an autonomous actor included in the robotic retrieval system may activate to engage with the robotic handle. For example, the end effector may activate an electromagnet to produce a magnetic field. The magnetic field may attract the robotic handle to upwards (away from gravity) and into a grasping enclosure of the end effector. Once attracted upwards, the grasping enclosure may secure around the robotic handle. This two-step grasping may save time as the robotic handle does not have to be precisely grasped such as by a set of two or three flanges which may be included in the end effector. In addition, if secured by the robotic handle, the robotic retrieval system may be configured to extract the overpackage from a pile of overpackages, even if the overpackage enclosing the object of interest is located on the bottom of the pile.

Once the overpackage is in the grasp of the end effector (e.g., by suction or robotic handle), the robotic retrieval system may move the overpackage to a destination location for further processing. The processing may include picking objects for an order, stowing objects in a location, or sorting objects being added to the fulfillment center. In some cases, these processes may be performed without human touch.

FIG. 1 is a block diagram showing an example robotic retrieval system capable of retrieving an overpackage using an end effector. The robotic retrieval system 100 in FIG. 1 shows a gantry which includes a first support 102 and a second support 104 connected by a first lateral rail 106 and a second lateral rail 108. The gantry also includes a cross-rail 112 which is perpendicular to the first lateral rail 106 and the second lateral rail 108. The cross-rail 112 is coupled to the first lateral rail 106 and the second lateral rail 108 such that the cross-rail 112 can traverse an area 110 under the gantry to, for example, retrieve an object enclosed in an overpackage 300. The overpackage 300 may be self-identifying by including one or more indicators on its surface which can encode or otherwise convey information about the indicator (e.g., size, location on the overpackage 300) as well as the overpackage 300 (e.g., a unique identifier for the overpackage 300).

The cross-rail 112 may traverse the area 110 using a rail motor 114. The rail motor 114 may be driven to cause the cross-rail 112 to slide along the first lateral rail 106 and the second lateral rail 108. In some implementations, the cross-rail 112 may be driven using belts, electromagnetism, or other driver. FIG. 1 shows the rail motor 114 coupled with the first lateral rail 106. In some implementations, the rail motor 114 may be coupled with the second lateral rail 108. In some implementations, the cross-rail 112 may be driven by a driver on both the first lateral rail 106 and the second lateral rail 108.

The rail motor 114 may be driven through command messages transmitted to the rail motor 114 from a controlling device. The command messages may form control signals that can be interpreted by the rail motor 114 or a controlling device. In some implementations, the controlling device may be a grasping mount 150.

The grasping mount 150 may be coupled with the cross-rail 112. The grasping mount 150 is moveably coupled with the cross-rail 112 to allow an end effector 200 to traverse the area 110 under the gantry. The grasping mount 150 may be driven along the cross-rail 112 using a motor 154. In some implementations, the grasping mount 150 may be driven using belts, electromagnetism, or other driver. The motor 154 may be driven through command messages transmitted to the motor 154 from a controlling device. In some implementations, the controlling device may be included in the grasping mount 150.

By driving one or both of the rail motor 114 and the motor 154, the end effector 200 may be positioned over a location in the area 110 such as to retrieve the overpackage 300. To determine the location of the end effector 200 and the location of the overpackage, the grasping mount 150 may include a sensor 156. The sensor 156 may be an optical sensor (e.g., camera), acoustic sensor, or wireless signal sensor. The sensor 156 may be mounted on a shaft 152 of grasping mount 150. It may be desirable to position the sensor 156 at a known distance from the ground. In this way, a sensing model can be constructed to provide proximate location of the sensor 156 in relation to the detected information.

The shaft 152 may house electronics such as a processor to control the sensor 156 and receive data detected by the sensor 156, a wireless or wired transceiver to communicate detected data or control messages, and a power source to provide power to the grasping mount 150. The shaft 152 may include a winding mechanism to extend or retract a tether 160. Examples of the winding mechanism include a winch or a pulley which may be adjusted to control the length of the tether 160 extended from the shaft 152. The tether 160 may be flexible but having a test weight sufficient to hold an object enclosed in the overpackage 300. One end of the tether 160 may be coupled to the winding mechanism within the shaft 152. The other end of the tether 160 may be coupled to an end effector 200.

The end effector 200 may be lowered or raised to interact with the overpackage 300. The end effector 200 may be lowered or raised using the winding mechanism. The end effector 200 may include components that can be activated to detect or couple with the overpackage 300. For example, a set of flanges may be included in the end effector 200 to mechanically secure a portion of the overpackage 300 to the end effector 200 by pivoting about an outer body of the end effector 200. The end effector 200 may communicate with the processor other controlling device. In some implementations, the tether 160 may be a braided tether including a data communication path to the processor included in the shaft 152. In some implementations, the end effector 200 may include a wireless communication device such as a BLUETOOTH™ transceiver to communicate with the controlling device. Between the tether 160, the rail motor 114, and the motor 154, the end effector 200 may be moved in three dimensions within the area 110.

As the sensor 156 and the end effector 200 approach the overpackage 300, the grasping mount 150 and/or the end effector 200 may be adjusted to position the end effector 200 at a pick point 320 of the overpackage 300. The pick point 320 may be coupled to an envelope 310 which forms an inner recess to contain the object. The coupling between the pick point 320 and the envelope 310 may be formed by a tether 340. The tether 340 may be flexible but having a test weight sufficient to hold an object enclosed in the overpackage.

The robotic retrieval system 100 of FIG. 1 shows the end effector 200 in a pincer configuration. A set of flanges may be closed around the pick point 320 to attach the overpackage 300 to the end effector 200. In some implementations, the end effector 200 may use alternative structure to couple with the overpackage 300. For example, suction may be used to attach the end effector 200 to the overpackage 300. In such implementations, the tether 160 may include a hollow tube coupled with a vacuum system to provide a vacuum force to engage with the overpackage 300. As shown in the robotic retrieval system 100, the end effector 200 moved through the area 110 via a gantry. In some implementations, the end effector 200 may be mounted to a robotic arm, mobile drive unit, or other autonomous actor with mechanisms to position the end effector 200 in a two or three dimensional space.

Figure 2A:
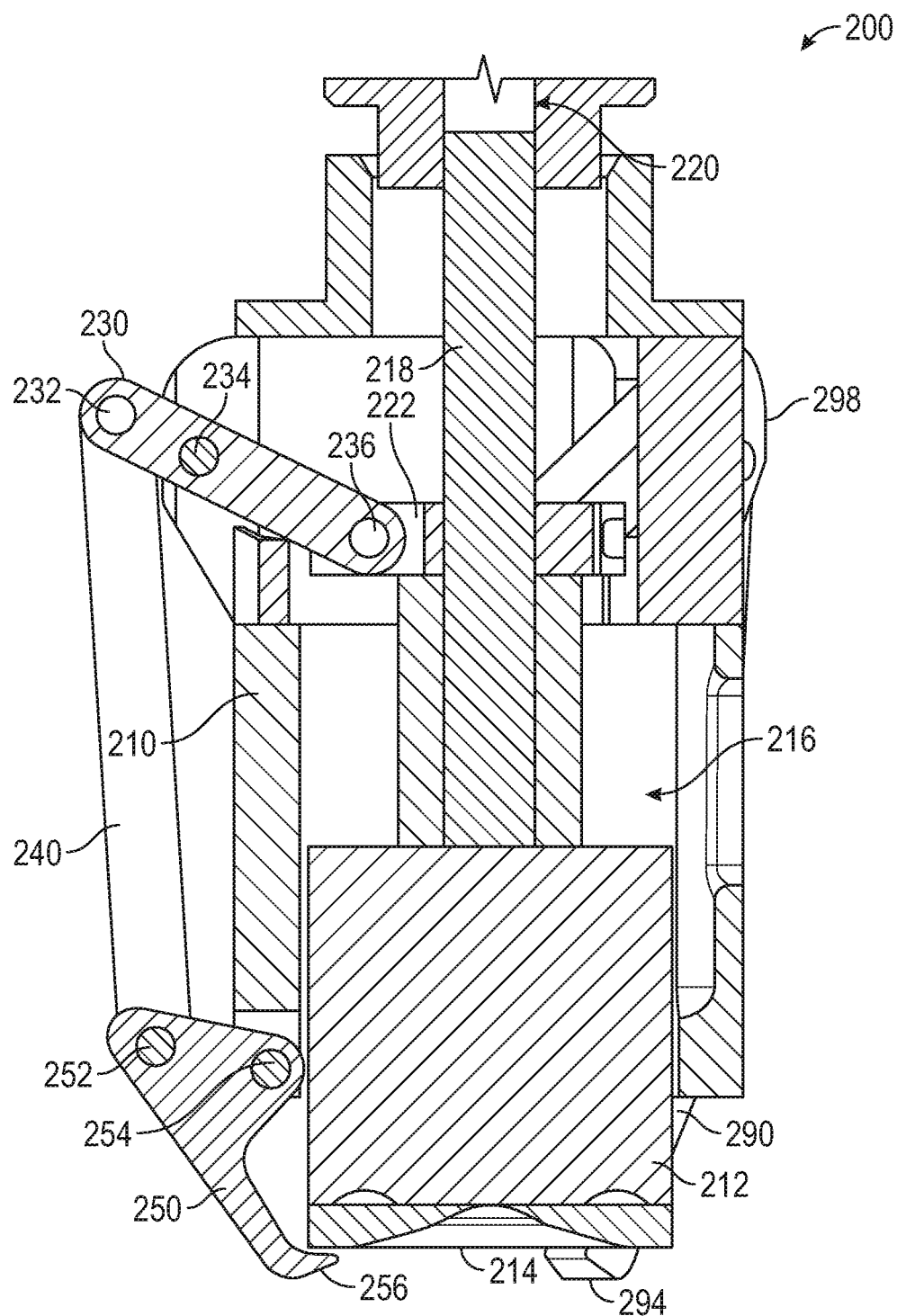
FIG. 2A is a diagram showing an illustrative end effector prior to engagement with a pick point.

FIG. 2A is a diagram showing an illustrative end effector prior to engagement with a pick point 320. The end effector 200 includes an attachment 220 which may receive a tether for coupling the end effector 200 with the shaft 152.

A piston 218 may be included within the end effector 200. The piston 218 may be coupled with a lifting mechanism to control the location of the piston 218. The lifting mechanism may include a solenoid, motor, two-way pneumatic actuator, or other activated mechanism to lift, hold, and release the piston 218. The piston 218 is coupled with a receiving body 212 and a lifting block 222. Once the lifting mechanism is activated, the receiving body 212 and the lifting block 222 rise into an inner recess 216 of the end effector 200.

The inner recess 216 may be formed by an outer wall 210. The receiving body 212 may be coupled with a receiving surface 214. The receiving body 212 may include a passive or an active element configured to attract a pick point of an overpackage (e.g., the overpackage 300). For example, the receiving body 212 may include an electromagnet that is activated when the end effector 200 is located within a threshold distance (e.g., attractor threshold) of the pick point of the overpackage 300. As another example, the receiving surface 214 may include an orifice which may be coupled to a vacuum system included in the receiving body 212. The orifice may be disposed on the receiving surface 214 to provide a vacuum force in conjunction with the vacuum system.

A first hinge 236 may couple a first link 230 of a flange assembly to the lifting block 222. A first pivot 234 may be included to further couple the first link 230 to the outer wall 210. The first pivot 234 may include a pin attached to the end effector 200. The first link 230 may include an opening to receive the pin and rotate round the pin as the first hinge 236 is moved. The first pivot 234 allows the flange assembly to toggle position such as by raising the first hinge 236 as the piston 218 elevates the lifting block 222.

A second hinge 232 may be included to hinge the first link 230 to a second link 240 of the flange assembly. The second link 240 is provided to transfer a force to a flange 250. The flange 250 may be coupled to the second link 240 via hinge 252 and to the outer wall 210 via wall pivot 254. As the second link 240 is driven down, the force at the hinge 252 causes the flange 250 to pivot via the wall pivot 254. As with the first pivot 234, the wall pivot 254 may include a pin attached to the end effector 200. The flange 250 may include an opening to receive the pin and rotate around the pin as the hinge 252 is moved. This action, in turn, swings a tip 256 of the flange 250 upward toward the receiving body 212.

FIG. 2A is shown as a cut-away diagram to illustrate internal and external features of the end effector 200. A second flange 290 is shown along with a corresponding tip 294 (similar to the tip 256) and a corresponding first link 298 (similar to the first link 230) for a second flange assembly. In some implementations, the end effector 200 includes three or more flange assemblies.

The end effector 200 may include an outer body that defines the inner recess 216 that is elongate along an axis. The piston 218 may be configured to move along the axis and be disposed within the inner recess 216. The receiving body 212 may be formed to receive the pick point 320. The receiving body 212 may have a first end and a second end opposite the first end. The first end may include the receiving surface 214 and the second end may be supported by the piston 218. The end effector 200 may include a set of flanges supported by the outer body such that each flange of the set of flanges are pivotable about the outer body. Each flange of the set of flanges may define a tip which can, in a first configuration, be spaced at a first distance from the axis when the piston 218 is in an extended position along the axis. In a second configuration in which the piston 218 is in a retracted position along the axis. In the second configuration, the flexible tether of the overpackage 300 may be elongate along the axis between the tips (e.g., tip 256, tip 294), and each of the tips are spaced at a respective second distances from the axis where the second distance for a tip is less than the first distance for the tip.

Figure 2B:
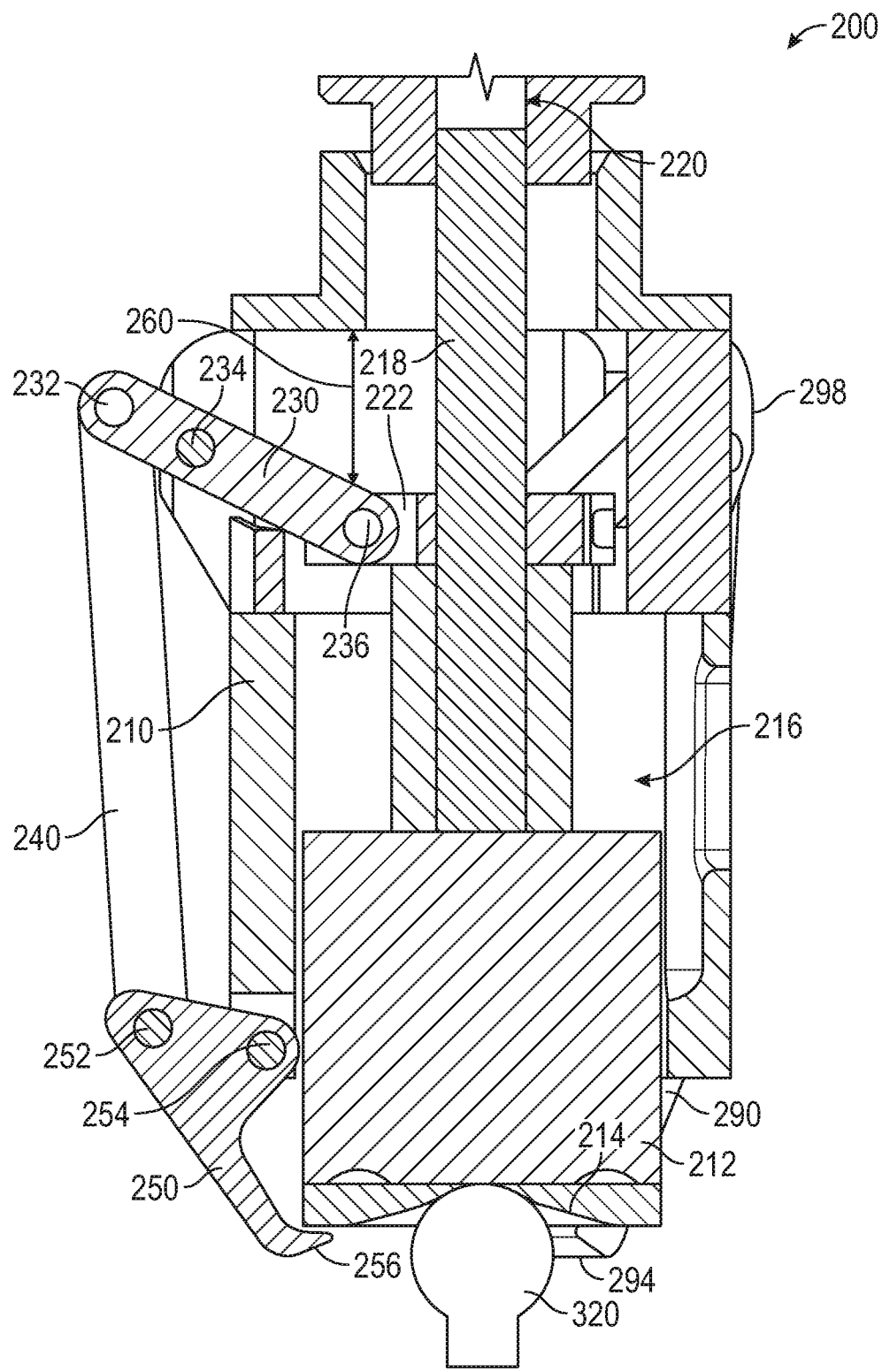
FIG. 2B is a diagram showing an illustrative end effector approaching a pick point.

FIG. 2B is a diagram showing an illustrative end effector approaching a pick point. In FIG. 2B, the pick point 320 of the overpackage 300 is shown as engaged with the receiving body 212. As discussed, the receiving body 212 may be activated to engage with the pick point 320. For example, the receiving body 212 may create a magnetic field to attract a magnetic pick point. In some implementations, the receiving body 212 may create at least a partial vacuum to create a pressure gradient sufficient to attract and engage the pick point 320.

In some implementations, the pick point 320 may additionally or alternatively activate. In such implementations, the proximity of the receiving body 212 may cause activation of the pick point 320. The activation of the pick point 320 causes the end effector 200 to engage with the pick point 320 at the receiving body 212. In some implementations, the activation of the pick point 320 may be to facilitate positioning of the end effector 200. For example, the pick point 320 may include a light emitter or sound emitter. The emissions can be stable to provide a beacon for the end effector 200 to follow. The emissions can be varied to indicate the relative distance between the pick point 320 and the end effector 200. For example, the emissions may be modulated such that the rate of modulation is based on the distance between the pick point 320 and the end effector 200.

Figure 2C:
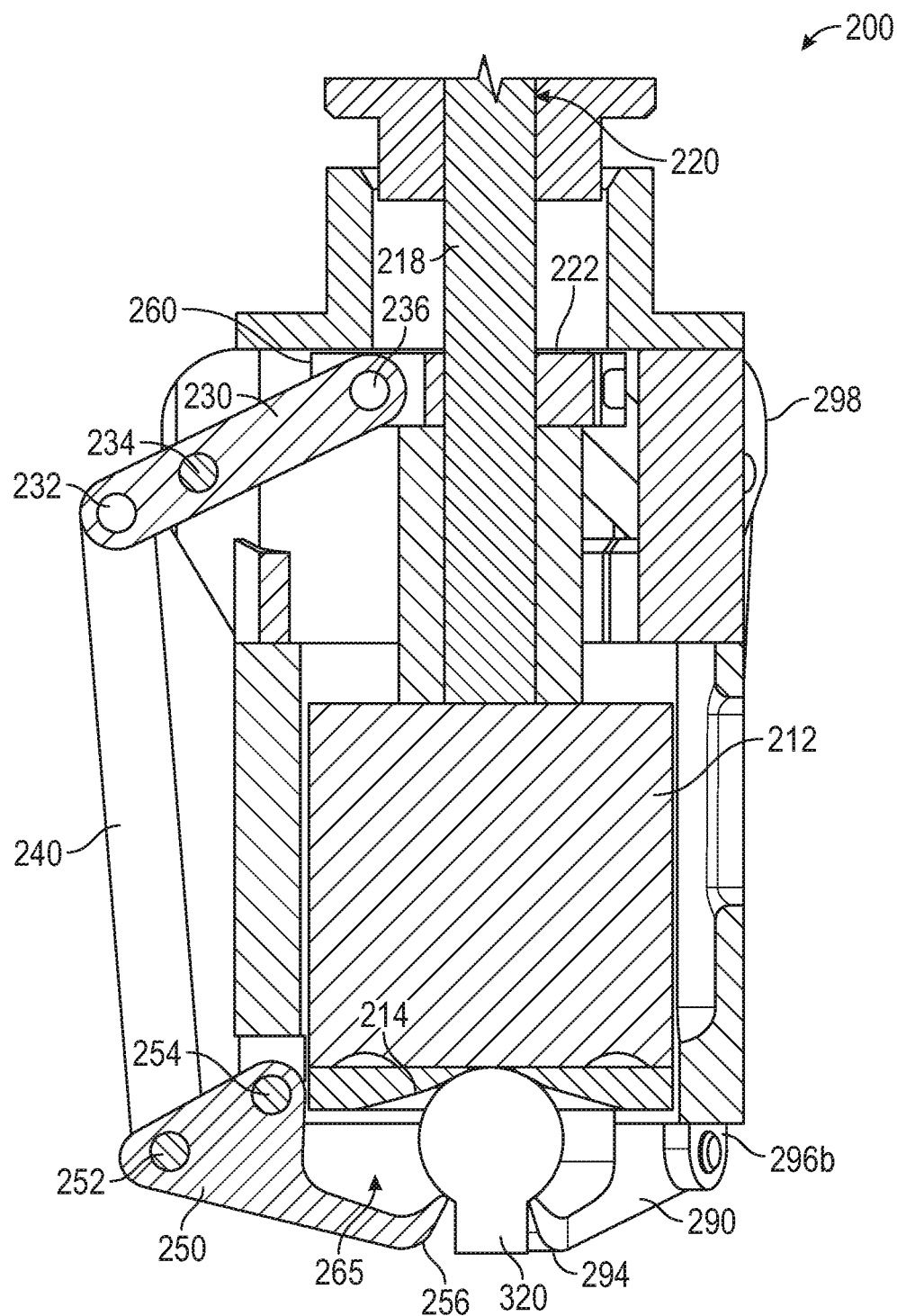
FIG. 2C is a diagram showing an illustrative end effector engaged with a pick point.

Within the inner recess 216, a space 260 exists between the lifting block 222 and a surface of the outer wall 210. However, as shown in FIG. 2C, once the lifting block 222 is pulled up by the piston 218, the space 260 will reduce in size. This lifting causes the engagement of the end effector 200 with the pick point 320 of the overpackage 300.

FIG. 2C is a diagram showing an illustrative end effector engaged with a pick point. In FIG. 2C, the piston 218 has lifted the lifting block 222 into the inner recess 216 along with the lifting block 222. Note that the space 260 between the lifting block 222 and the surface of the outer wall 210 in FIG. 2C is smaller than the space 260 as shown in FIG. 2B. The first link 230, pivoting on the first pivot 234, drives the second link 240 downward which, in turn, lowers the hinge 252. In so lowering the hinge 252, the flange 250 pivots along the wall pivot 254 to raise the tip 256 to engage with the pick point 320.

Figure 2D:
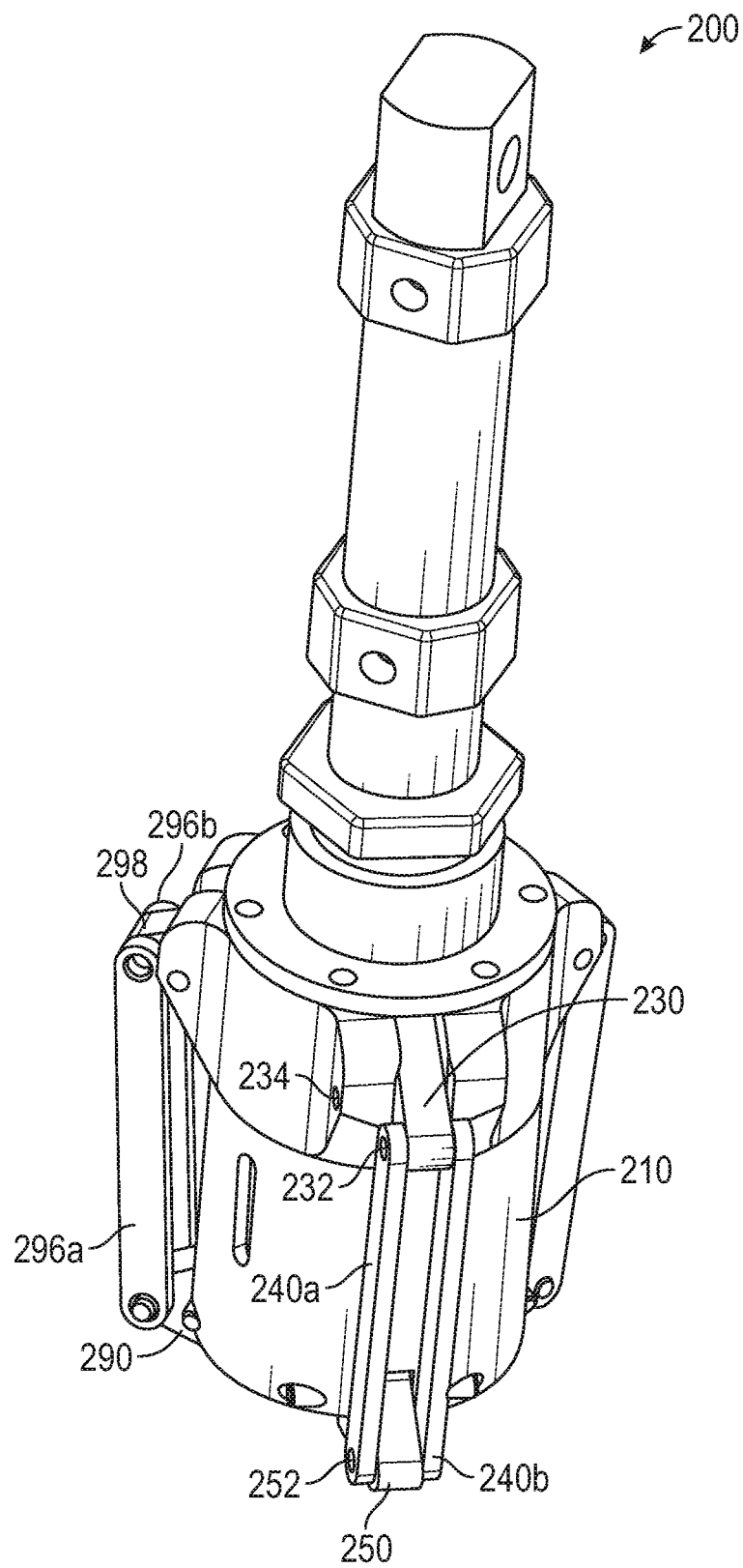
FIG. 2D is a diagram showing a perspective view of an illustrative end effector.

FIG. 2D is a diagram showing a perspective view of an illustrative end effector. The end effector 200 shown in FIG. 2D illustrates one arrangement of flange assemblies for the end effector 200. A first flange assembly includes the first link 230. The first link 230 is also coupled to the outer wall 210 via the first pivot 234. The first flange assembly may include parallel second links 240a and 240b. One end of the parallel second links 240a and 240b is coupled to the first link 230 via the second hinge 232. An opposing end of the parallel second links 240a and 240b is coupled to the flange 250 via the hinge 252.

A second flange assembly is also shown in FIG. 2D. The second flange assembly includes first link 298 (which corresponds to the first link 230 of the first flange assembly). The second flange assembly includes parallel second links 296a and 296b (which correspond to the parallel second links 240a and 240b of the first flange assembly). The second flange assembly may include a flange 290 (which corresponds to the flange 250 of the first flange assembly).

Although the embodiment shown in FIG. 2D depicts three flange assemblies, an end effector may include fewer or more flange assemblies in similar or alternative arrangements to engage with a pick point as described.

Figure 2E:
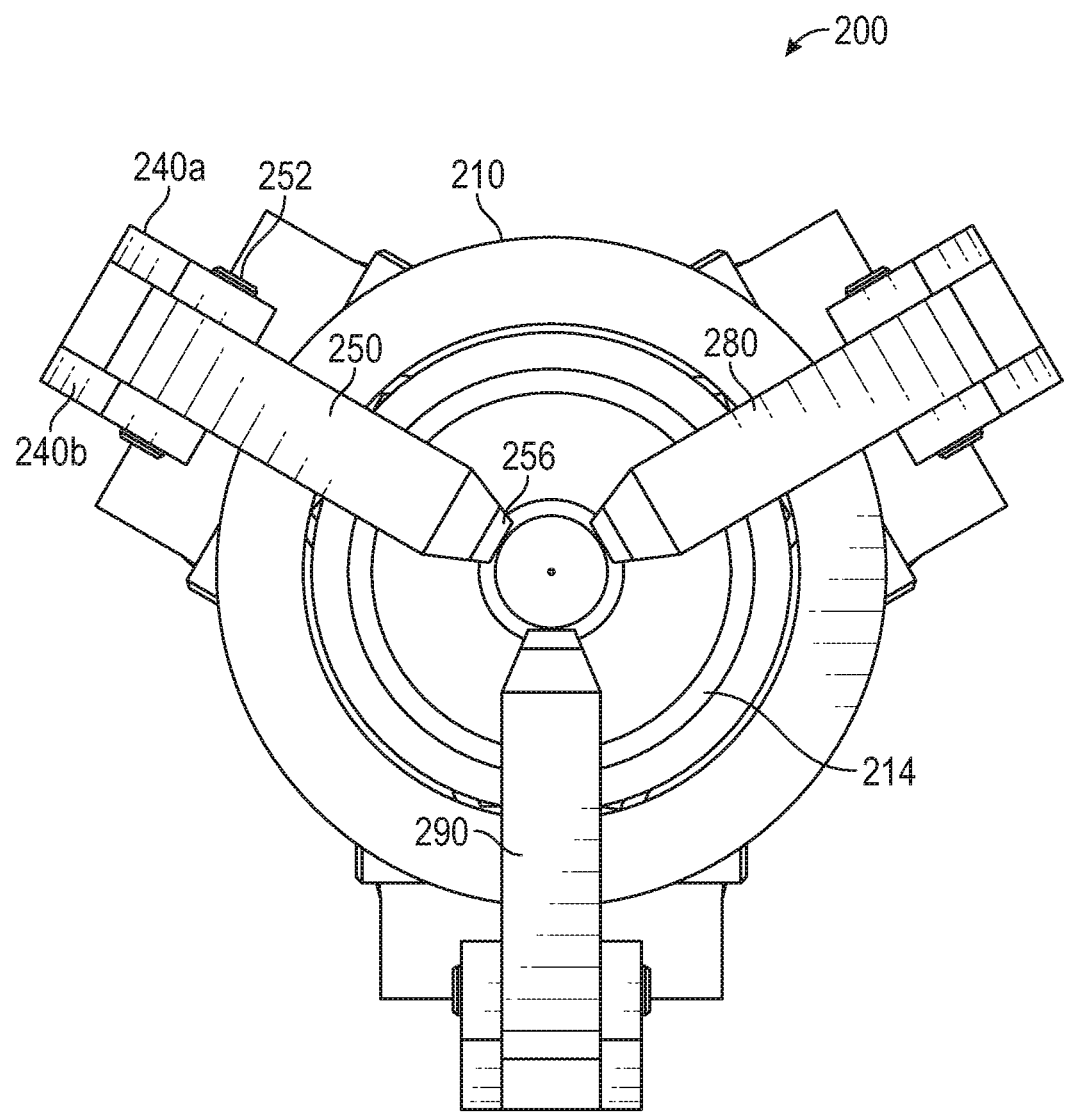
FIG. 2E is a diagram showing a view of an illustrative end effector from a receiving surface perspective.

FIG. 2E is a diagram showing a view of an illustrative end effector from a receiving surface perspective. The end effector 200 shown in FIG. 2E illustrates another view of the arrangement of flange assemblies for the end effector 200 shown in FIG. 2D. The receiving surface 214 is partially obscured by flanges 250, 280, and 290 which may have been moved in response to the piston 218 moving to a retracted position. The movement of the flanges 250, 280, and 290 may be along respective hinges such as the hinge 252 associated with the flange 250. In the retracted position shown in FIG. 2E, the tip 256 would engage the pick point 320 of the overpackage 300 (not shown).

Figure 2F:
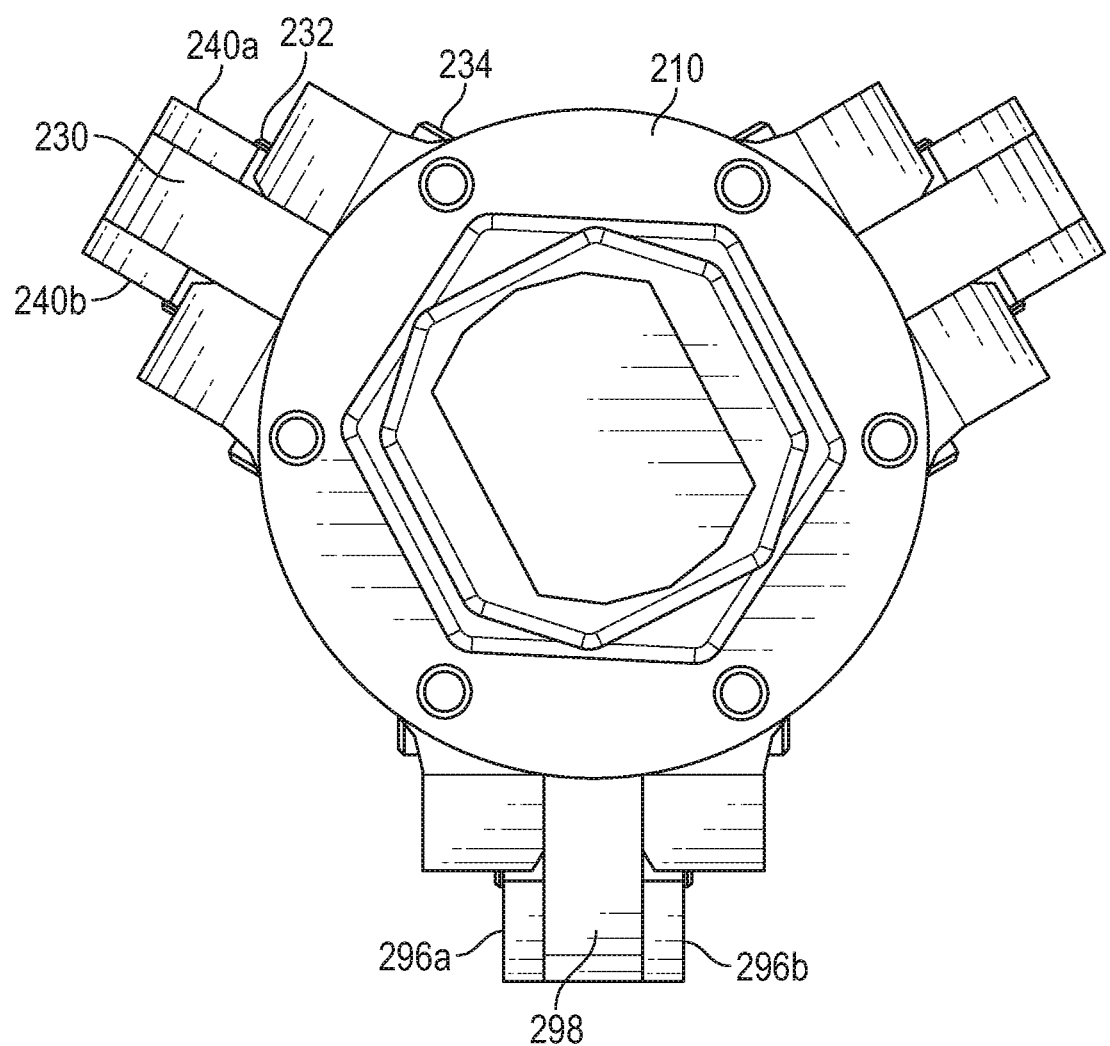
FIG. 2F is a diagram showing a view of an illustrative end effector from an overhead perspective.

FIG. 2F is a diagram showing a view of an illustrative end effector from an overhead perspective. The end effector 200 shown in FIG. 2F illustrates another view of the arrangement of flange assemblies for the end effector 200 shown in FIG. 2D. The end effector 200 shown in FIG. 2F from a perspective opposing the receiving surface 214. The end effector 200 shown in FIG. 2F illustrate the positioning of the first links (e.g., first link 230 and first link 298) relative to the respective parallel second links (e.g., parallel second links 240a, 240b and parallel second links 296a, 296b). The second hinge 232 and the first pivot 234 are also identified for the first flange assembly.

In some embodiments, the end effector 200 may be configured to attract and grasp an object. The end effector 200 may include an outer body that defines an inner recess (e.g., the inner recess 216) that is elongate along an axis. The end effector 200 may include a piston (e.g., the piston 218) configured to move along the axis and disposed within the inner recess. The end effector 200 may include an electromagnet having a first end and a second end opposite the first end, the first end comprising a receiving surface and the second end supported by the piston. The end effector 200 may also include a set of flanges supported by the outer body such that each of the set of flanges are pivotable about the outer body, each flange of the set of flanges defining a tip. The end effector 200 may have a first configuration in which the piston is in an extended position along the axis and a first tip for a flange included in the set of flanges is spaced at a first distance from the first axis. In a second configuration of the end effector 200, the piston is in a retracted position along the axis and the first tip is spaced at a second distance from the axis, the second distance being less than the first distance.

In some embodiments, the end effector 200 includes a pneumatic actuator configured to actuate the piston between the first and second configurations. The receiving surface of the electromagnet may define a conical recess. At least a portion of the receiving surface may be formed of or comprise plastic. In some embodiments, the end effector 200 may include a set of linkages that link each flange of the set of flanges to the piston. Each linkage of the set of linkages may include a first link pivotably supported by the outer body and connected to the piston and a second link pivotably connected to the first link and the respective flange. In some embodiments, the electromagnet may be connected to the piston via a spacer. Each flange may elongate along a second axis and each tip is spaced apart from the second axis along a third axis that intersects with the second axis. It may be desirable that, in the first configuration, the receiving surface extend below the outer body and in the second configuration, the receiving surface be disposed within the inner recess.

Figure 3:
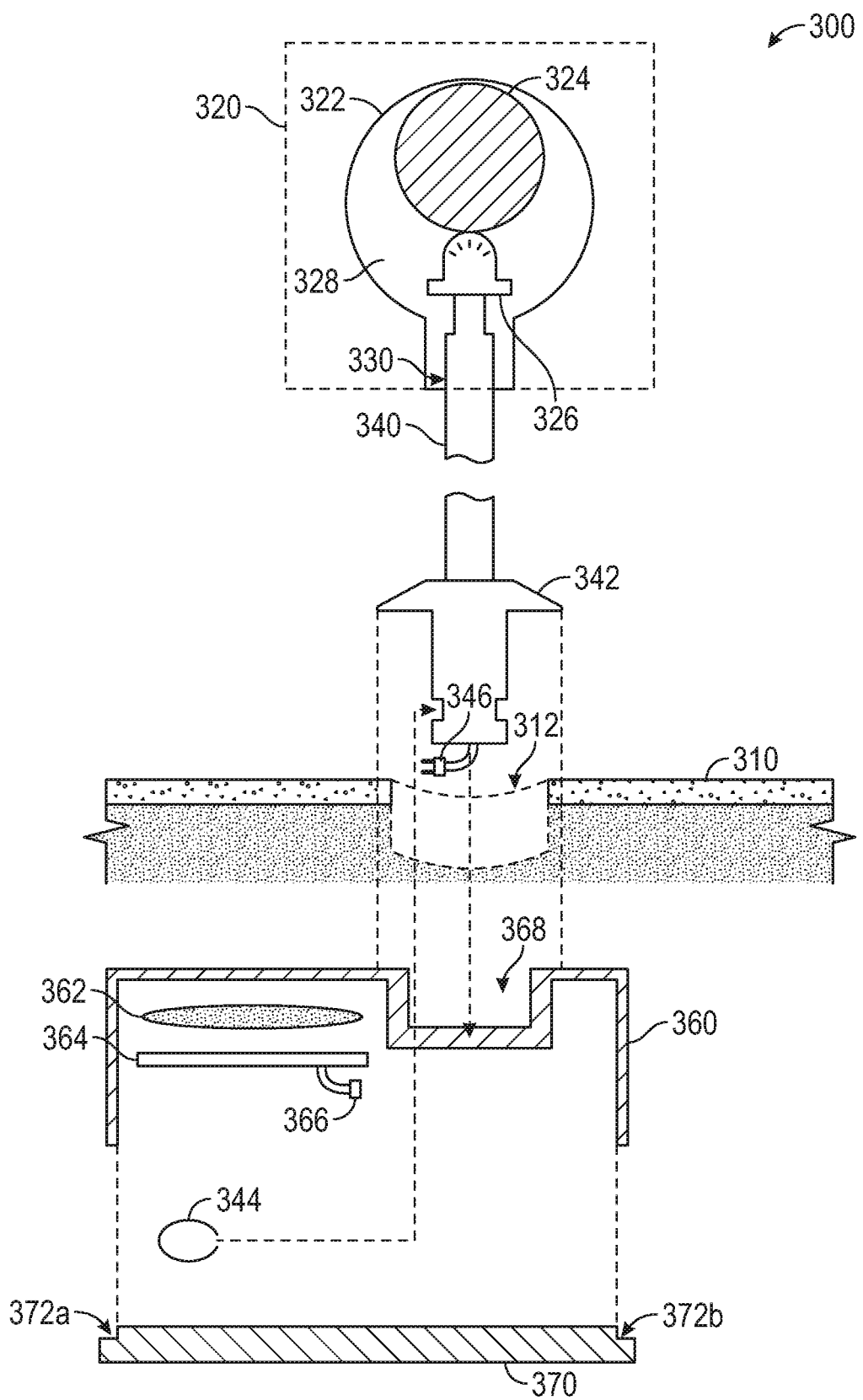
FIG. 3 is a diagram showing an example overpackage that may be discovered and moved by an end effector.

FIG. 3 is a diagram showing an overpackage capable of retrieval by an autonomous actor with an end-effector. The overpackage 300 includes the pick point 320. The pick point 320 is shown as a cut-away to facilitate description of the interior of the pick point 320. An outer shell 322 forms around an inner body 328 in which a metallic bearing 324 and an emitter 326 are located. The inner body 328 may be formed by injection molding a partially translucent plastic or plastomer. In some implementations, the tether 340 may be implemented as a conductive tether. The conductive tether may physically and communicatively couple the pick point 320 with a mounting grommet 342. The mounting grommet 342 may be received by the envelope 310 through an opening 312. Once the mounting grommet 342 is seated within the opening 312, a ring 344 may secure the mounting grommet 342.

The overpackage 300 may include electronics to control activation of the pick point 320 or other features to facilitate robotic location and retrieval of the overpackage 300. The electronics may be included in an electronic enclosure formed by a base portion 360 and a cover portion 370. The cover portion 370 may include seal portion 372a and seal portion 372b to engage with the base portion 360. In some implementations, the seal portion 372b may be a continuous seal portion such as a circular seal around the base portion 360. The base portion 360 may include a power source 362 and a microcontroller 364. The microcontroller 364 may receive power from the power source 362 and execute specific instructions to perform at least some of the methods described herein. The tether 340 may enclose a conductive wire 346 for activating the emitter 326. The conductive wire 346 may connect to the microcontroller 364 via a coupling port 366. It will be appreciated that additional or alternative emitters may be included and coupled with the microcontroller 364 in a manner similar to that shown in FIG. 3. In some implementations, an emitter may be included on a printed circuit board with the microcontroller 364. For example, a low energy BLUETOOTH transceiver may be included to transmit and receive information between the overpackage 300 and the retrieval system.

The overpackage 300 may be implemented as a bag with multiple ferromagnetic pick points that pivot freely relative to the bag. Since the ability to grasp objects from any orientation may be desirable to facilitate reliable grasping of objects, the shape of the pick point 320 may be a uniform or semi-uniform three-dimensional shape such as a sphere. The bag may be formed of nylon, canvas, or other fabric that can support the load expected for objects stored with the overpackage 300. Multiple bag sizes may be used to accommodate objects having different physical characteristics (e.g., shape, weight, packaging, etc.).

The overpackage 300 shown in FIG. 3 includes one pick point. However, different overpackages may have different numbers of pick points. For example, for a large object, it may be necessary to use two end effectors to lift the mass. In such instances, at least two pick points may be included. Another factor for deciding the number of pick points is the bin or tote in which the overpackage 300 will be stored. If the bin or tote includes space to allow the overpackages to spread out, fewer pick points may be included because the likelihood that the pick point will be accessible by the end effector is higher than a crowded location where the likelihood that a pick point will be covered by another overpackage.

The pick point 320 may include a ball bearing and an LED cast into a single epoxy sphere which may be connected to a sheathed wire to support the weight of the overpackage 300 with an object. The integrated LED allows the robotic retrieval system to locate the pick point, and the ball bearing may be easily attracted to an electromagnet on the end effector (e.g., included in the receiving body 212). The main electronics for the overpackage 300 may be attached to the overpackage fabric, and connect to each pick point. When the LED is activated, the epoxy sphere may shine with near uniform intensity. This allows the sensors of the robotic retrieval system to locate the actual pick point such as by image analysis of images captured by a sensor included in the robotic retrieval system 100.

Figure 4:
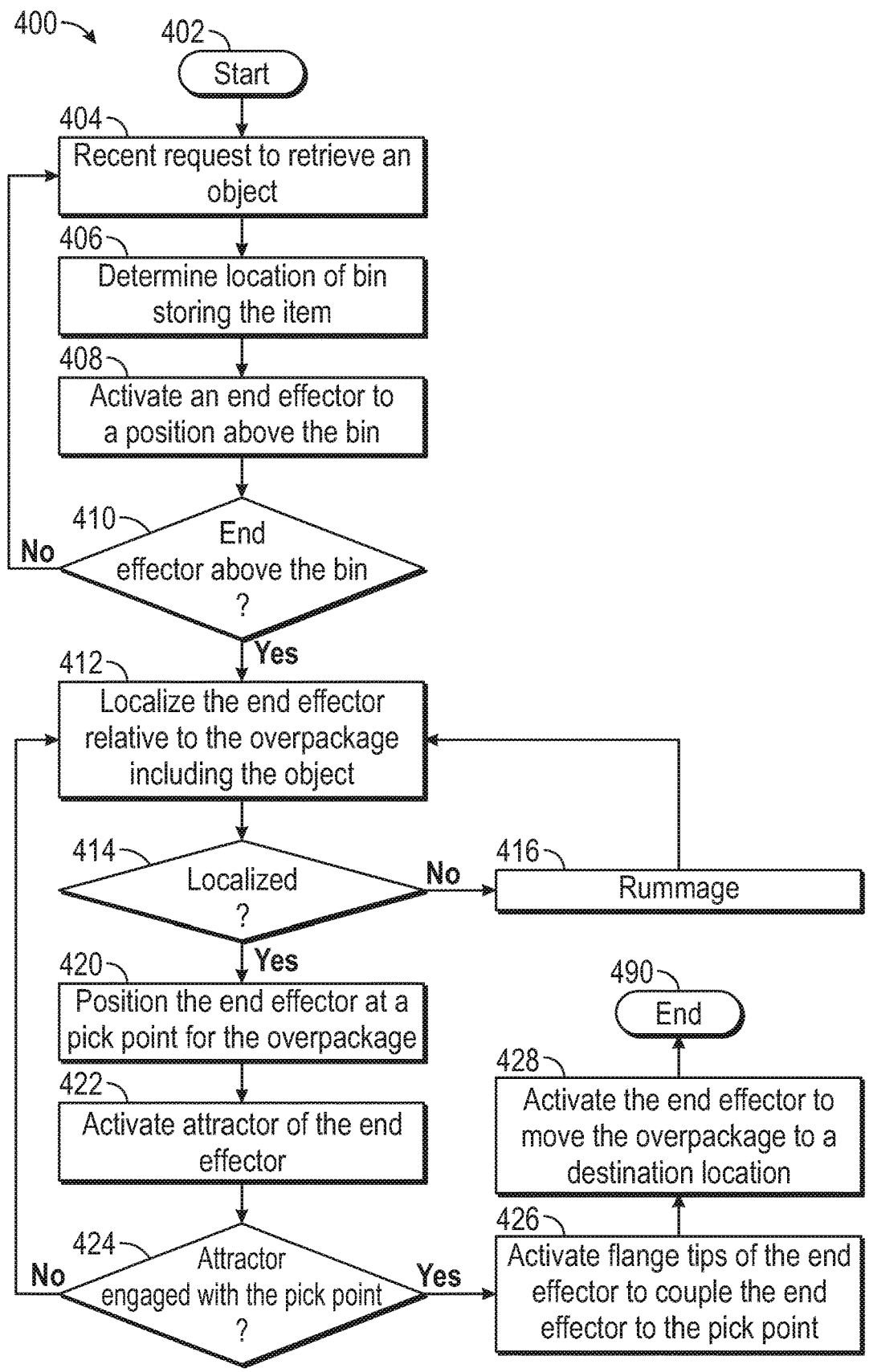
FIG. 4 is a flow diagram depicting an example method of retrieving an object enclosed in an overpackage with a handle using an end effector.

FIG. 4 is a flow diagram depicting an example method of retrieving an object enclosed in an overpackage with a handle using an end effector. The method 400 may be implemented in whole or in part by the devices described such as the robotic retrieval system. The method 400 shows how an end effector may be controlled to provide efficient and accurate retrieval of an object enclosed in an overpackage.

The method 400 begins at block 402. At block 404, the robotic retrieval system may receive a request to retrieve an object. The request may identify the object using a unique object identifier. The request may include a destination location indicating where the object should be placed once retrieved. The request may be received from an automated fulfillment system in response to an order for the object. For example, an online catalog system may present objects currently in inventory and facilitate transaction to request the object for delivery.

At block 406, the robotic retrieval system may determine a location of the object. The object may be stowed in a bin within the fulfillment system. When the object was received at the fulfillment system, the object may be placed in an overpackage such as the overpackage 300. The object and the overpackage 300 may be scanned to create a record relating the object and the overpackage 300. The overpackage 300 may then be stored in a bin which may be placed on a rack within the fulfillment system. As the overpackage 300 is moved, a record of its location may be updated. The determination at block 406 may include determining the location of the overpackage 300 within the fulfillment system. The location may be specified using an identifier for a bin in which the overpackage 300 was placed or a rack on which the bin is stored.

In some implementations, at the time of the request, the bin including the overpackage 300 may not be accessible by an end effector. In such implementations, the robotic retrieval system may transmit a command to a mobile drive unit or other autonomous actor at the fulfillment center to retrieve the bin and place the bin into an area accessible by a gantry such as that shown in FIG. 1.

Once the bin storing the overpackage including the object is within an area associated with an end effector, at block 408, the end effector 200 may be activated to a position above the bin reported to include the overpackage 300. Activating the end effector 200 may include driving one or more motors or other devices to position the end effector 200. The end effector 200 may periodically collect sensor data such as by capturing images or transmitting a wireless signal such as an RFID interrogation signal. The activation may be based on the sensor data. For example, if an image is captured beneath the end effector 200, the image may be analyzed to determine whether an identifier associated with the overpackage 300 is shown in the image. The identifier may be a QR code, AprilTag, barcode, or other machine detectable identifier encoding information to uniquely identify the overpackage 300 or its location. The activation may include activating the overpackage 300. For example, the overpackage 300 may include an emitter configured to provide emissions for guiding the end effector 200 to the overpackage's location.

At block 410, the robotic retrieval system may determine whether the end effector 200 is above the bin including the overpackage 300. The determination may be based on data collected by the sensor 156 coupled to the end effector 200. The determination may be based on sensor data collected by another element of the robotic retrieval system. For example, the gantry may include one or more cameras for sensing the location of the end effector 200 and objects within the area under the gantry. A camera may include depth sensors to allow relative measures of location along three dimensions to be generated for objects in the area under the gantry. In some implementations, the determination may include determining an (x,y) location in the area under the gantry by taking the difference of two images: one with an emitter included in the pick point 320 on and one with it off. Blob detection or other object recognition computer vision techniques may be performed on the output. This method 400 can filter out the majority of noise caused by lighting or background. As another example, the motor 154 or the rail motor 114 may identify their location. The location may be identified in absolute terms or relative to a location within the fulfillment center such as the gantry or the area 110. The location of the motor 154 or the rail motor 114 may be used to determine the location of the end effector 200. In some implementations, two or more elements may provide location information. The provided locations may be compared to identify or triangulate the location of the end effector 200.

If the determination is at block 410 is negative, the method 500 may return to block 406 as described above. If the determination at block 410 is affirmative, at block 412, the robotic retrieval system may localize the end effector 200 relative to the overpackage 300 including the object. The localization may include determining a location of the overpackage 300 within the bin. The localization may include collecting information with one or more sensors and analyzing the collected information as described.

At block 414, the robotic retrieval system may determine whether the end effector 200 as able to be localized relative to the overpackage 300. The determination may include one or more of: identifying the overpackage 300 within the bin, identifying a specific orientation of the overpackage 300, and identifying a specific element of the overpackage 300 such as the pick point 320. The identification may be based on identifiers associated with the overpackage 300 (e.g., light emitter).

If the determination at block 414 is negative, at block 416, the robotic retrieval system may initiate a rummaging procedure. The rummaging procedure may include activating an end effector to move one or more overpackages at or near a location of the desired overpackage. For example, the overpackage 300 may be stowed in a tote with several other overpackages. The other overpackages within the tote may block the sensor from detecting the first identifier of the desired overpackage. In such instances, moving the other overpackages may expose the overpackage 300 of interest. In some implementations, rummaging may include activating other autonomous actors within the fulfillment center. For example, if the tote is retrieved from a location using a mobile drive unit, a command message may be provided to cause the mobile drive unit to shake the tote such as by moving forward and backward or tilting the tote. Once the rummaging is completed, the method 400 may return to block 412 as described.

Returning to block 414, if the end effector 200 is localized vis-a-vis the overpackage 300, at block 420, the robotic retrieval system may position the end effector 200 at the pick point 320 of the overpackage 300. The positioning at block 420 may include activating the rail motor 114, the motor 154, or a winding mechanism associated with the end effector 200. The positioning may move the end effector 200 to be within a specific distance from the pick point 320 such that the pick point 320 can be attracted to the end effector 200 such as via electromagnetism.

At block 422, the robotic retrieval system may activate an attractor included in the receiving body 212 associated with the end effector 200. The activation may include collecting additional sensor data to confirm that the pick point 320 of the overpackage 300 containing the object requested is positioned within range of the receiving body 212. The range may be defined by an activation threshold distance from which an identifier on the pick point can be detected by a sensor on the end effector 200. In some implementations, the activation may be triggered by a message from the robotic retrieval system. For example, if a camera on the gantry is used to determine the position of the end effector 200, the images may be analyzed to determine when the end effector 200 is located within a threshold distance to the pick point 320. Activating the attractor of the receiving body may include generating a magnetic field or creating a negative pressure gradient to draw the pick point 320 toward the receiving surface 214.

To find height of the pick point (z axis position) and thus determine how much tether to release to lower the grasping heard.

Stereoscopic cameras may be used to capture stereo image pairs which can be analyzed to determine the distance of a point shown in the image pair. In some implementations, a sensor array may be used to determine the height of the pick point. One example sensor array includes a camera and a point rangefinder. Another example sensor array includes a camera and a scanning rangefinder. The sensor array including a single camera and a point rangefinder may be desirable due to its robustness, speed, and simplicity as compared to the other configurations.

At block 424, a determination is made as to whether the pick point 320 is engaged with the end effector 200. The determination may be based on a sensor included in the receiving surface 214 that is configured to activate when coupled with a pick point. The sensor may be implemented as an engagement detector configured to collect measurements near the receiving body 212. For example, the determination may be made based on a detected difference in the magnetic field or pressure generated by the attractor. In some implementations, the determination at block 424 may be based on information detected by the overpackage 300. For example, the electronics of the overpackage may include an accelerometer to detect when the pick point 320 is moved. In some implementations, the pick point 320 may include a detector to sense engagement with the end effector 200. One example of such a detector is a magnetometer which can sense a change in magnetic fields. Where the attractor engages using a magnetic field, a magnetometer may detect the emitted field. In some implementations, a tension sensor may be included to detect tension on the tether 160 coupled to the end effector 200. The detected tension may be compared to a threshold tension and, if the detected tension corresponds to the threshold tension, engagement with the pick point 320 is deemed to have occurred.

The determination at block 424 may include features to tolerate minor inaccuracies in (x,y,z) location determination of the pick point. One feature is to place a photo-resistor array around the radius of the end effector and use the light intensity of emissions from the pick point to guide the end effector towards the strongest light source. Another embodiment may include a camera in the end effector. The camera may capture images which can be processed to detect the light source (e.g., pick point).

If the determination at block 424 is negative, the method 400 may proceed to block 412 to localize and reposition the end effector 200 as described above. The repositioning of the end effector 200 may include collecting additional sensor data regarding the position of the end effector 200 or the overpackage 300. In some implementations, the overpackage 300 may be hidden from view such as under other overpackages. In such instance, repositioning the end effector 200 may include engaging with a pick point of another overpackage and moving the other overpackage to another position within the container. Repositioning may include activating one or more motors to change the position of the end effector 200.

If the determination at block 424 is affirmative, the method 400 may proceed to block 426 to activate one or more flange tips of the end effector 200 to couple the end effector 200 to the pick point 320 of the overpackage 300. The securing of the pick point 320 may include suction engagement or other pressurized coupling to attach the overpackage 300 to the end effector 200.

At block 428, the end effector 200 may be activated to move the overpackage 300 and the object enclosed therein to a destination location. In some implementations, the destination location may be a bin or other conveyor near the gantry. The bin or other conveyor may move the overpackage 300 toward the ultimate destination. The method 400 ends at block 490.

Although the features discussed generally relate to a warehouse storing objects to fulfill orders, the robotic retrieval features may be implemented in other environments. For example, the gantry may be included to cover a bed of a delivery truck. Objects may be loaded onto the truck and as a delivery route is traversed, the end effector 200 may be activated to retrieve objects for an upcoming location on the delivery route. As objects are retrieved, they may be presented to an accessible location on the truck such as to the cab of the truck or an access port into the bed. A delivery agent may thus retrieve the object from the accessible location for final delivery.

Although the features discussed generally relate to retrieving objects, the same features may be used for receiving objects at a fulfillment center. In such implementations, an object is associated with an overpackage and placed at an ingestion point. A command to retrieve the object and move it to a container may be processed using a method such as the method 400 shown in FIG. 4.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

In an embodiment of the robotic retrieval system, the retrieval may be described as a workflow. The first step in the process may be pairing the incoming objects with an overpackage and a tote. Once entry scan is completed the objects may be stored in a warehouse or other storage facility until they are requested and retrieved by robotic drive units. Totes then enter the order fulfillment system envelope where they may be activated from a low power state and prepared for request. The system may then moves the gantry head over the tote and the system communicates with the overpackages to request a certain object. Upon request the overpackage may signal its location using emitters such as LEDs in its pick points. The pick points may be recognized and localized by a computer vision system receiving image data from a sensor on the end effector or mounted to the gantry. Once a suitable pick point is selected the end effector may position itself for pickup. An electromagnet attractor may be activated to pull a ferromagnetic pick point into the grasping mechanism. The object may then be removed from the tote and placed in at a destination location such as a corresponding order tote. If no pick points are visible or eligible the system may invoke an error handling mode (e.g., rummaging) where it may place the topmost object from the tote into a buffer until the pick points become visible and/or eligible. The features increase the efficiency of this process by simplifying the grasping, identification, and localization.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A delivery information device (e.g. delivery information system) can be or include a microprocessor, but in the alternative, the delivery information device can be or include a controller, microcontroller, or state machine, combinations of the same, or the like configured to efficiently process and present event data for delivery of an object. A delivery information device can include electrical circuitry configured to process computer-executable instructions. Although described herein primarily with respect to digital technology, a delivery information device may also include primarily analog components. For example, some or all of the filtering algorithms or interfaces described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, interface, or algorithm described in connection with the embodiments disclosed herein can be embodied directly in specifically tailored hardware, in a specialized software module executed by a delivery information device, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An illustrative storage medium can be coupled to the delivery information device such that the delivery information device can read information from, and write information to, the storage medium. In the alternative, the storage medium can be integral to the delivery information device. The delivery information device and the storage medium can reside in an application specific integrated circuit (ASIC). The ASIC can reside in an access device or other delivery information device. In the alternative, the delivery information device and the storage medium can reside as discrete components in a filtering device or electronic communication device. In some implementations, the method may be a computer-implemented method performed under the control of a computing device, such as an access device or electronic communication device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically.

Thus, although the various schematics shown in the Figures depict example arrangements of elements and components, additional intervening elements, devices, features, or components may be present in an actual embodiment (assuming that the functionality of the depicted circuits is not adversely affected). While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A robotic retrieval system comprising:
    an end effector including:
        an outer body that defines an inner recess, the inner recess being elongate along an axis;
        a piston configured to move along the axis and disposed within the inner recess;
        a receiving body configured to receive a pick point coupled to a flexible tether, the receiving body having a first end and a second end opposite the first end, the first end comprising a receiving surface and the second end supported by the piston; and
        a set of flanges supported by the outer body such that each flange of the set of flanges is pivotable about the outer body, each flange of the set of flanges defining a tip,
        wherein the robotic retrieval system has a first configuration in which the piston is in an extended position along the axis and a first tip of a flange included in the set of flanges is spaced at a first distance from the axis, and
        wherein the robotic retrieval system has a second configuration in which the piston is in a retracted position along the axis, the pick point is in contact with the receiving surface, the flexible tether is elongate along the axis between the tips, and the first tip is spaced at a second distance from the axis, the second distance being less than the first distance; and
    a motor configured to position the end effector within an area including the pick point.

2. The robotic retrieval system of claim 1, wherein the receiving body comprises an electromagnet.

3. The robotic retrieval system of claim 1, wherein the end effector further comprises a vacuum system and the receiving surface defines an orifice configured to provide a vacuum force in conjunction with the vacuum system.

4. An end effector configured to attract and grasp an object, the end effector comprising:
    an outer body that defines an inner recess, the inner recess being elongate along an axis;
    a piston configured to move along the axis and disposed within the inner recess;
    an electromagnet having a first end and a second end opposite the first end, the first end comprising a receiving surface and the second end supported by the piston; and
    a set of flanges supported by the outer body such that each flange of the set of flanges is pivotable about the outer body, each flange of the set of flanges defining a tip,
    wherein the end effector has a first configuration in which the piston is in an extended position along the axis and a first tip of a flange included in the set of flanges is spaced at a first distance from the axis, and
    wherein the end effector has a second configuration in which the piston is in a retracted position along the axis and the first tip is spaced at a second distance from the axis, the second distance being less than the first distance.

5. The end effector of claim 4, further comprising a pneumatic actuator configured to actuate the piston between the first and second configurations.

6. The end effector of claim 4, wherein the receiving surface of the electromagnet defines a conical recess.

7. The end effector of claim 6, wherein at least a portion of the receiving surface comprises plastic.

8. The end effector of claim 4, further comprising a set of linkages that link each flange of the set of flanges to the piston, each linkage of the set of linkages comprising:
    a first link pivotably supported by the outer body and connected to the piston; and
    a second link pivotably connected to the first link and the respective flange.

9. The end effector of claim 4, wherein the electromagnet is connected to the piston via a spacer.

10. The end effector of claim 4, wherein each flange of the set of flanges is elongate along a second axis and each tip is spaced apart from the second axis along a third axis that intersects with the second axis.

11. The end effector of claim 4, wherein in the first configuration, the receiving surface extends below the outer body and in the second configuration, the receiving surface is disposed within the inner recess.

12. A computer-implemented method of robotic object retrieval, the computer-implemented method comprising:
    under control of one or more processing devices:
        receiving a request for an object;
        determining a location for a bin where the object is stored;
        activating an end effector to a position relative to the bin based at least in part on the location;
        determining that the end effector is located relative to the bin;
        activating a receiving body included in the end effector to attract a pick point of an overpackage within the bin, wherein the overpackage contains the object;
        detecting engagement of the pick point with the receiving body;

in response to detecting the engagement, adjusting a piston coupled with a set of flanges included in the end effector to couple the end effector to the pick point; and activating the end effector to move the object to a destination location.

13. The computer-implemented method of claim 12, further comprising:

receiving sensor data indicating a distance between the end effector and the overpackage, wherein activating the receiving body is based at least in part on determining that the distance corresponds to an attractor threshold.

14. The computer-implemented method of claim 12, further comprising:

determining that the piston is in a retracted position, wherein the retracted position of the piston causes coupling with the pick point via the set of flanges; and deactivating the receiving body in response to the determining that the piston is in the retracted position.

15. The computer-implemented method of claim 12, wherein activating the receiving body comprises generating an electromagnetic field, and wherein the pick point is magnetically active.

16. The computer-implemented method claim 15 further comprising:

monitoring the electromagnetic field over time;

detecting a variance in the electromagnetic field between a first time and a second time; and determining that the variance corresponds to an engagement threshold, wherein determining that the pick point is engaged with the receiving body is based at least in part on the variance corresponding to the engagement threshold.

17. The computer-implemented method of claim 12, wherein activating the end effector comprises at least one of:

activating a motor to move the end effector to the position over the bin; and activating a winch to raise or lower at least a portion of the end effector.

18. The computer-implemented method of claim 12, further comprising:

transmitting a message to cause activation of an emitter included in the overpackage; and detect an emission from the emitter, wherein the determining that the end effector is located above the bin is based at least in part on the emission.

19. The computer-implemented method of claim 12, further comprising:

capturing an image of at least a portion of the bin;

detecting a graphic code shown in the image, wherein the graphic code encodes: (a) an identifier associated with the object, (b) dimensions of the graphic code, and (c) location of the graphic code on the overpackage; and determining a current location of the end effector based at least in part on the dimensions of the graphic code and location of the graphic code as compared to the graphic code as shown in the image.

20. The computer-implemented method of claim 12, wherein adjusting the piston to couple the end effector to the pick point comprises adjusting the piston from an extended position along an axis, wherein a first tip of a flange in the set of flanges is spaced at a first distance from the axis when the piston is in the extended position; and adjusting the piston to a retracted position along the axis, wherein the first tip is spaced at a second distance from the axis, the second distance being less than the first distance.

* * * * *

UNITED STATES PATENT AND TRADEMARK OFFICE
CERTIFICATE OF CORRECTION

PATENT NO. : 10,751,882 B1
APPLICATION NO. : 15/978995
DATED : August 25, 2020
INVENTOR(S) : Brady et al.

Page 1 of 1

It is certified that error appears in the above-identified patent and that said Letters Patent is hereby corrected as shown below:

In the Claims

In Column 19, Line 26, Claim 16, after "method" insert --of--.

In Column 20, Line 26 (Approx.), Claim 20, delete "comprises" and insert --comprises:--.

Signed and Sealed this
Tenth Day of November, 2020

Andrei Iancu
*Director of the United States Patent and Trademark Office*